March 31, 1970  P. STANWELL  3,504,315
ELECTRICAL SOLENOID DEVICES
Filed Dec. 5, 1967
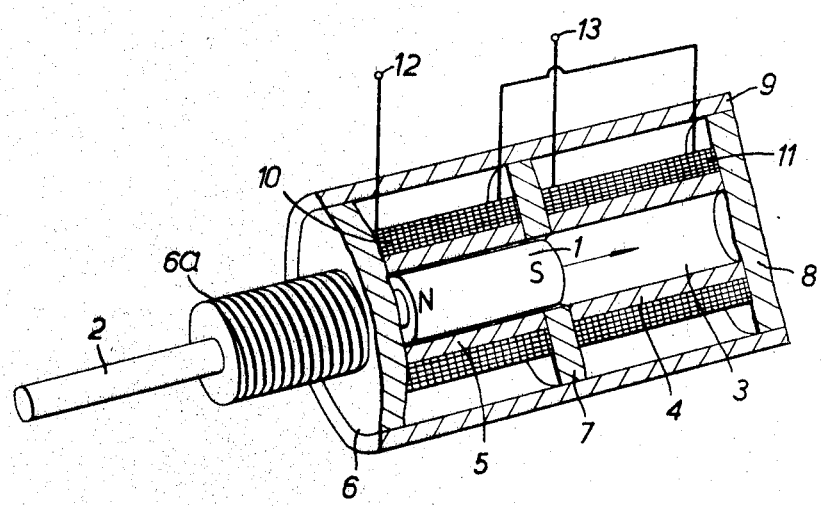

United States Patent Office

3,504,315
Patented Mar. 31, 1970

3,504,315
ELECTRICAL SOLENOID DEVICES
Peter Stanwell, Ilford, England, assignor to The Plessey Company Limited, Ilford, England, a British company
Filed Dec. 5, 1967, Ser. No. 688,093
Int. Cl. H01f 7/08
U.S. Cl. 335—234                        3 Claims

ABSTRACT OF THE DISCLOSURE

A D.C. polarised linear solenoid includes a permanently longitudinally magnetised armature cooperating with a reversibly magnetisable core structure provided with a magnetising winding and with two pole members spaced longitudinally by a distance equal to twice the mutual distance of the two poles of the armature, the core structure also having a third pole member positioned half way between the two longitudinally spaced pole members to provide a closed magnetic circuit when the armature is in one of the other of its end positions.

---

This invention relates to electrical solenoid devices having an armature arranged for linear movement between two end portions, one of which it will assume when a solenoid is energised by an electric current in a solenoid winding. Such solenoids will hereinafter be called linear solenoid devices.

In linear solenoid devices as hitherto constructed the armature was constructed of soft iron or other low remanence magnetisable material and was moved when the solenoid winding was energised by an electric current, from a nominal position, to which it was resiliently biased, to a second position in which it remained only as long as the energising current continued to flow.

The present invention has for an object to provide an improved linear solenoid device which when moved to one of its end positions by energisation of the solenoid winding, will be magnetically retained in that position when the current ceases to flow so that the armature will, in the absence of energising current, be stable in each end position.

According to the invention and referring to the direction of armature movement as the longitudinal direction a linear solenoid device includes a permanently longitudinally magnetised armature, actuating means attached to said armature, a reversible magnetisable core structure for cooperation with the magnetised armature, a magnetising winding for said core structure the core structure having two pole members spaced longitudinally by a distance approximately twice the mutual distance of the two poles of said armature and a third pole member positioned approximately half way between said two longitudinally spaced pole members so that in each of two end positions of the armature said third pole member together with one or the other of said two pole members and the part of the core structure interconnecting the third pole member with said one or the other pole member form a nearly closed iron circuit between the two poles of the armature the arrangement being such that upon energisation of said magnetising winding said two pole members are magnetised in one polarity while said third pole member is magnetised in the opposite polarity.

The devices according to the invention is particularly suitable to provide a double-acting solenoid device whose armature will be firmly magnetically retained in each end position. This can be achieved by providing the pole structure with two windings spaced longitudinally from each other and interconnected to produce mutually opposed magnetic fields.

One embodiment of a preferred form of the invention is illustrated in the accompanying drawing, which is a part sectional elevation of a double-acting solenoid device.

Referring to the drawing, a cylindrical armature 1 of high remanence material for example of the ferrite material known under the registered trademark Caslox II is permanently magnetised with its North and South poles at its two ends and attached to it is a rod 2 of brass or other non-magnetic material which serves to transmit the armature movement to an element to be actuated. The armature 1 is longitudinally movable with a sliding fit along a cylindrical passage 3 formed by two identical non-magnetic sleeves 4 and 5, of brass or plastics material, and by an annular soft-iron pole member 7 interposed between the adjacent ends of the two sleeves 4 and 5.

This annular pole member 7 is positioned in the centre of the length of a soft-iron tube 9 closed at its two ends by disc-shaped soft-iron outer pole members 6 and 8 the former of which has a central bore for the passage of the rod 2 and a screw threaded external boss 6a, by which the solenoid device may be held in position, the sleeves 4 and 5 being clamped between a centre pole member 7 and the two outer pole members 6 and 8 respectively.

Stator windings 10 and 11 are wound on the non-magnetic sleeves 4 and 5 and are connected in series in such a manner that when a current is passed through them, between terminals 12 and 13, the two windings magnetise the two end portions of the tube 9 in opposite directions so as to produce one polarity in magnetic pole member 7 and poles of the opposite polarity in each of pole members 6 and 8.

In considering the operation of the device it may be assumed that the armature 1 is in the position shown in the drawing. Owing to the permanent magnetisation of the armature a magnetic flux will pass from the north pole N of the armature 1, through pole member 6, part of the length of tube 9, and the centre pole member 7 to the south pole S of the armature 1, which in this position of the armature form a substantially closed iron circuit so that any displacement of the armature 1 away from the pole member 6 and towards pole member 8 will tend to increase the reluctance of the magnetic circuit and will therefore be opposed by magnetic forces.

If now a voltage of suitable polarity is applied to the terminals 12 and 13, the windings 10 and 11 will produce north poles in the soft iron pole members 6 and 8 and a south pole in the centre pole member 7. These poles will cooperate with the poles N and S of the armature 1, polarised as shown in the drawing, to move the armature in the direction indicated by the arrow, since the north pole provided in pole member 6 repels the permanent north pole N of the armature 1, while at the same time the south pole provided in pole member 7 attracts the permanent north pole N of the armature 1 and the north pole provided in pole member 8 attracts the permanent south pole S of the armature 1.

If when the armature 1 has travelled to its other end position and has made contact with the pole member 8, the voltage applied to the terminals 12 and 13 is removed, the armature 1 will remain securely in its position due to the magnetic circuit now formed between the permanent south pole S of the armature 1, the soft-iron pole member 8, the soft-iron tube 9, the soft-iron pole member 7 and the permanent north pole N of the armature 1. When a voltage is applied to the terminals 12 and 13 in the reverse polarity to that previously mentioned the pole members 6, 7 and 8 are polarised south, north and south respectively and as a result the armature will return to the illustrated position in a manner which will now be readily appreciated.

In the drawing the north pole end of the armature 1 has for clarity of illustration been shown slightly spaced from the pole member 6, although in fact the armature will tend to assume a position in contact with that pole member.

It will be readily appreciated from the foregong description that when the armature is at one of its end positions it is very firmly held in that position by the respective closed magnetic circuit so formed. Furthermore, due to the presence of the third centrally positioned pole member and the magnetic fields formed therein the armature has a more positive and faster movement than has hitherto been possible from linear solenoid devices.

A number of modifications may be made to the device without departing from the scope of the invention. For instance, the armature and pole members instead of having circular cross-section may be of any other desired cross-section. Furthermore, while as shown and preferred the pole members 6 and 8 have portions facing the ends of the armature 1, they could be made annular similar to pole member 7, with the end of the armature arranged to project into their central aperture.

According to alternative modifications the stroke of the armature could be terminated shortly before contact with the pole pieces 6 and 8, for example by the interposition of a layer of non-magnetisable material.

The uses of a solenoid device according to the invention are wide and varied. They include automatically actuated valves, levers, push-buttons etc., which may be held in each of two positions without the use of electric power. Since no current is required to hold the armature in position, the windings may be heavily loaded during operation without damage to the windings, since current pulses of very short duration are all that are required to operate the device. Furthermore, the construction of the device lends itself readily to the provision of a long operating stroke.

What we claim is:

1. A linear solenoid device comprising a magnetisable core structure having three longitudinally spaced pole-members; a permanently longitudinally magnetised armature longitudinally displaceable within said core structure between two end positions, the ends of said armature coinciding with adjacent pairs of said pole-members at each of said end positions; and a magnetising winding associated with said core structure and adapted when energised to cause adjacent pairs of said pole-members to be oppositely polarised in dependence upon the polarity of said energisation, the magnetising winding being effective when energised for causing the armature to assume either one of its two end positions dependent upon the polarisation of said pole-members.

2. A linear solenoid device according to claim 1, wherein the magnetisable core structure includes a cylindrical casing of magnetic material; end plates of magnetic material for closing said casing, said end plates constituting pole-members; and an annular disc located midway between said end plates to define the third pole-member, and wherein the magnetised armature is arranged for longitudinal movement in said casing, the magnetising winding being arranged to surround said armature within said casing so that energisation of the magnetising winding causes the armature to assume either of its two end positions in each of which one end of the armature abuts one of the end plates.

3. A linear solenoid device according to claim 2, wherein the magnetising winding comprises two fixed coils, one coil located between each pair of adjacent pole-members.

References Cited

UNITED STATES PATENTS

| 3,126,501 | 3/1964 | Flora | 335—254 XR |
| 3,202,886 | 8/1965 | Kramer | 335—234 |
| 3,218,523 | 11/1965 | Benson | 335—234 |
| 3,379,214 | 4/1968 | Weinberg | 335—234 XR |

G. HARRIS, Primary Examiner

U.S. Cl. X.R.

335—254